United States Patent Office 3,703,455
Patented Nov. 21, 1972

3,703,455
ELECTROCOATING METHOD BASED ON COPOLYMERS CONTAINING MALEIC HALF ESTERS
Kazys Sekmakas, Chicago, Ill., assignor to De Soto, Inc., Des Plaines, Ill.
No Drawing. Continuation-in-part of application Ser. No. 885,273, Dec. 15, 1969. This application Apr. 21, 1970, Ser. No. 30,588
Int. Cl. B01k 5/02; C23b 13/00
U.S. Cl. 204—181         24 Claims

ABSTRACT OF THE DISCLOSURE

Styrene and like ethylenic monomers are copolymerized with maleic, fumaric or itaconic half esters; maleic, fumaric or itaconic bis esters being optionally present, at least a portion of the ester groups including a hydrocarbon chain containing 6 or more carbon atoms. The copolymerization is carried out in solution in an ether alcohol, such as 2-butoxy ethanol, or in bulk. The copolymers may be reacted with a small proportion of monoepoxide. The copolymers are dispersible in water with the aid of a base and are particularly adapted to electrodeposit corrosion and detergent resistant films.

---

The present application is a continuation-in-part of my prior copending application Ser. No. 885,273, filed Dec. 15, 1969, now abandoned.

The present invention relates to the electrodeposition at the anode of a unidirectional electrical system of corrosion and detergent resistant films and to copolymers of monoethylenic monomers, and especially monovinyl aromatic monomers, with maleic half esters which are particularly adapted for such purpose.

Copolymers of maleic anhydride and styrene are known, and these have been half esterified with alcohols such as ethyl or butyl alcohol, but electrodeposition of such copolymers results in the deposition of a film which contains many microporosities and these lead to the penetration of aqueous materials resulting in corrosion. Curiously, maleic anhydride and styrene or like monomers exhibit a strong tendency to heteropolymerize with one another, a tendency which is not present in the copolymerizations to be described hereinafter.

In an effort to improve the corrosion resistance of electrodeposited films, it has been the practice to minimize the weight proportion of unsaturated acid incorporated into the copolymer which is used. The superior corrosion resistance achieved in the invention is surprising since it is obtained with copolymers containing a very high weight proportion of unsaturated acid.

In an effort to provide stable water dispersions, the art has utilized unsaturated esters in which the terminal hydrocarbon groups are very short so as to avoid the presence of strongly hydrophobic groups in the resin which must be placed in stable aqueous dispersion. This invention essentially requires a quite different structure, namely, a large number of ester groups providing long chain hydrocarbon groups containing 6 or more carbon atoms.

In acordance with the present invention, a copolymer is employed which is constituted by maleic, fumaric or itaconic half ester which has been copolymerized with monoethylenically unsaturated material copolymerizable therewith, the copolymer to include at least 20% by weight, and preferably at least 25% by weight, of the said maleic, fumaric or itaconic half ester.

Referring more particularly to the proportion of monoethylenically unsaturated material which may be copolymerized with the maleic, fumaric, or itaconic half ester, this may vary considerably from a minimum of about 50 mol percent to a maximum of about 80 weight percent. The maximum proportion will vary somewhat depending upon the hydrophobicity of the unsaturated material selected. Thus, less butyl methacrylate can be used than ethyl acrylate. With monovinyl aromatic compounds such as styrene, water dispersibility is maintained until about 78 weight percent of styrene is present when the ester group in the maleate compound is the isodecyl group.

The minimum proportion of monoethylenically unsaturated material is preferably selected to provide a molar excess thereof with respect to the maleic, fumaric or itaconic half ester and, preferably a molar excess of at least 2:1 is employed.

The ethylenic monomers which are copolymerized in accordance with the invention are monoethylenically unsaturated and are preferably free of functional groups other than the single ethylenic group relied upon for copolymerization. Thus, acrylate and methacrylate esters such as ethyl acrylate, isobutyl acrylate, methyl methacrylate and the like may be used or included in the copolymer. Ethylene, propylene, or butylene may also be used. Among the monomers which may optionally be present are hydroxy functional monomers such as hydroxyethyl acrylate or methacrylate, or allyl or methallyl alcohol. Bis esters such as dibutyl maleate or fumarate and especially longer chain diesters such as diisooctyl maleate or fumarate may be present to aid flexibility with lesser proportions of styrene. Short chain diesters such as dimethyl maleate can be used and are more soluble in water. Small amounts of acids such as acrylic acid, methacrylic acid or crotonic acid may also be present, but these should be minimized, e.g., less than about 5%.

While the long chain ester groups may be provided by an ester of any monoethylenically unsaturated carboxylic acid or by a bis ester, the polymer uniformity needed to provide superior electrocoating properties is best provided utilizing bis esters of maleic, fumaric or itaconic acids. These long chain esters are illustrated by 2-ethylhexyl acrylate, and the like, and the bis esters are illustrated by dioctyl maleate, dihexyl fumarate and dodecyl itaconate. These non-acidic long chain esters may constitute all or a portion of the large number of long chain hydrocarbon groups containing 6 or more carbon atoms which are needed in the invention.

The monoethylenic monomers which are particularly significant in this invention in providing economical coatings of exceptional hardness and detergent resistance are monovinyl aromatic compounds such as styrene, vinyl toluene, and lower alkyl and halogen substitution products thereof, particularly those in which the substituent is in the aromatic ring such as chlorostyrene. Particularly with these monovinyl aromatic compounds, it is preferred that there be used at least 2 mols thereof per mol of the maleic or fumaric half ester.

It is preferred to form the copolymer directly from the half ester rather than to first copolymerize maleic anhydride and then half esterify the copolymer and this preference goes beyond economic considerations since, in the invention, the copolymerization with the long chain half ester can be carrier out in a more concentrated solution medium and produces a less discolored product, both of which are important to coating utility. More particularly, maleic anhydride is poorly soluble in styrene which makes it necessary to use more solvent and the anhydride is more dangerous to use and tends to form heteropolymers. On the other hand, copolymers of styrene and maleic anhydride are available, for example, with 3 mols of styrene per mol of maleic anhydride, and these can be half esterified with a long chain monohydric alcohol such as isodecyl alcohol, and used in the present invention. On the other hand, using butanol, for example, the half ester when electrodeposited forms an inadequate film filled with microscopic discontinuities producing poor detergent and salt spray resistance. Moreover, even using isodecyl alcohol, the polymer produced by reacting the alcohol with the preformed anhydride copolymer is less uniform than that produced by the practice of this invention and, as a result, the stability of the aqueous dispersion is less satisfactory and even the solubility in aqueous medium is decreased. Also, the nonuniformity leads to films of somewhat reduced corrosion resistance, though they are far better than those obtained using lower alcohols.

The copolymers in the invention are produced by free radical copolymerization in organic solvent solution, preferably using a water miscible organic solvent in which the copolymer is soluble.

The organic solvent which is selected for the copolymerization constitutes an important feature of the invention since the choice of alcoholic solvents produces copolymers of superior color. While any alcohol may be selected, the invention is favored by high boiling solvents which permit polymerization at a temperature above about 100° C. without the use of pressure to maintain the liquid phase and by solvents which are water miscible. On this basis, it is particularly preferred to select ether alcohols such as 2-ethoxy ethanol and 2-butoxy ethanol, and especially the latter.

Less preferred alcohols are illustrated by methanol, ethanol, isopropanol, butanol and 2-ethyl hexanol.

Other solvents which may be used are methyl ethyl ketone, 2-ethoxy ethanol acetate, butyl acetate and the like. Where the superior color provided by alcoholic solvents is sacrificed, the high boiling water-miscible solvents are preferred.

Another feature of the invention which is partly attributable to solvent selection, partly attributable to high vinyl aromatic monomer content and partly attributable to the use of long chain esters, is the capacity to utilize copolymerization at high resin solids content so that the final solution product contains 40% or more of resin solids, preferably 55% or more of resin solids. This provides an important economy which helps to make the overall system practical. In this connection, maleic and fumaric long chain half esters are different from maleic anhydride and the explosive exotherm characteristic of the very rapid maleic anhydride heteropolymerization with styrene or like monomer does not take place, permitting reaction at the desired high ratio of monomers polymerized to solvent used.

The stability needed in electrocoating baths and the performance needed for detergent and salt spray resistance in coatings suggest a maximization of polymer uniformity. Surprisingly, it has been found that a trace of amine catalyst is helpful, though not essential.

In accordance with the present invention, a copolymer is employed which comprises maleic, fumaric or itaconic half ester, and the copolymerization reaction is preferably conducted at a temperature in excess of about 100° C. in order to speed the reaction and it is convenient to add the inter-mixed monomers and free radical polymerization catalyst to the solvent used maintained at elevated temperature. On the other hand, this is not required in the invention since the exotherm is very moderate and requires no precaution to control and since the desired copolymerization takes place quite well at lower reaction temperatures, e.g., at 75–85° C. As is known, the lower the reaction temperature, the higher the molecular weight of the copolymer, but the invention is not limited to low molecular weight since the higher molecular weights obtained by copolymerization, for example, at 80° C., are fully dispersible in water and provide excellent results in accordance with the invention.

As previously indicated, the alcohol used to half esterify the maleic, fumaric or itaconic acid or anhydride is a matter of considerable significance and it is essential, unless long chain bis esters are present (or less desirably a long chain monoester like octyl acrylate) that the esterifying alcohol contain at least 6 carbon atoms. On the other hand, longer chain alcohols are entirely useful such as 2-ethyl hexanol and isodecyl alcohol and even longer chain alcohols may be used in the invention where greater flexibility is desired in the final coating, such alcohols being illustrated by fatty alcohols corresponding to fatty acids such as linoleyl alcohol. Thus, the chain length of the alcohol can range from 6–22 carbon atoms, more preferably from 8–12 carbon atoms. The alcohol is usually a saturated alcohol, but unsaturated alcohols such as oleyl alcohol may be used so long as the unsaturation is relatively non-reactive as it is in oleyl alcohol. As a result, the copolymerization is not disturbed and some drying characteristics are provided to aid subsequent cure.

When shorter chain ester groups are used to form the acidic half ester, then it is essential that at least the same number of long chain ester groups be supplied by a non-acidic long chain ester of a monoethylenic acid, especially a maleic, fumaric or itaconic bis ester as would be supplied by the required proportion of half ester. Thus monobutyl maleate may be used in combination with long chain maleate bis esters.

When the bis ester is a liquid at the temperature of polymerization, then the copolymerization can be carried out to substantially 100% conversion to copolymer of somewhat higher molecular weight without added organic solvent or with far less solvent than would otherwise be needed. In the absence of added solvent vigorous agitation is needed, and the temperature should exceed 90° C., and preferably be above 120° C. The reaction is preferably started in a small heel and continued with slow addition of premixed monomers.

The free radical polymerization catalysts which are useful in solution polymerizations are well known, and these are illustrated herein by peroxides such as benzoyl peroxide and tertiary butyl perbenzoate.

The copolymers which are utilized in the invention desirably include a small proportion of hydroxy functionality which is easily introduced by reaction of the acid copolymer with a small proportion of monoepoxide, e.g., from 1–20% by weight of the copolymer which is modified. These monoepoxides are illustrated by propylene oxide and butylene oxide, but it is particularly preferred for best resistance to cratering and pin holing and other surface irregularities to employ 1–6%, preferably from 2–5%, based on the weight of the copolymer which is modified, of a glycidyl ester of an alpha-branched saturated monocarboxylic acid, preferably a tertiary fatty acid having the formula:

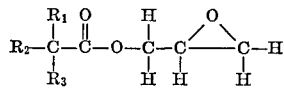

in which $R_1$ is an alkyl radical having a chain length of from 2–18 carbon atoms, and $R_2$ and $R_3$ are the same as $R_1$ or methyl or hydrogen. The compound in which $R_2$ and $R_3$ are each methyl and $R_1$ is a longer chain alkyl to provide an average molecular weight of 240 is identified as tertiary glycidyl ester A and is used in some of the examples hereinafter. The commercial product "Cardura E" (Shell Chemical Company) may be used.

The copolymer which is used has been described in various ways heretofore, but it is particularly preferred to employ copolymers having a final acid value in the range of 35–100, preferably 40–80.

The capacity of the invention to provide concentrated solutions in water miscible solvents is of special value in enabling the economical provision of aqueous dispersions containing from 12–45%, preferably from 20–40% by weight of water miscible solvent, preferably alcoholic, based on the weight of total resin in the dispersion.

The resins used can be applied clear or pigmented. The examples herein deposit clear films to minimize extraneous factors. In normal practice, these resins are frequently pigmented, the pigment being incorporated in the water free resin solution. Normal pigmentation is illustrated by titanium dioxide rutile incorporated by simple ball milling. A typical pigment to binder ratio is substantially 0.4:1, though this ratio may vary from 0.1:1 to 1:1 or higher, with values of 0.3:1 to 0.5:1 being more usual. The only caution to be observed is to avoid those pigments which are unduly sensitive to water. Corrosion resistant pigments may be used, but this is not essential.

The resins of the invention are preferably used in combination with an aminoplast resin. The term "aminoplast resin" is a common one used to define heat-hardening condensation products of amines and especially triazines with excess formaldehyde. Condensation products of excess formaldehyde with melamine, benzoquanamine, and urea constitute typical aminoplast resins and the copolymers of the invention exhibit good compatibility with such materials. The condensation reaction, as is well known, is normally carried out in alcoholic solvent medium, such as methanol, ethanol, butanol or higher alcohol. Broadly, the aminoplast helps the cure when used in water soluble or water dispersible form and proportions of 1–50%, preferably 5–40%, based on total resin, are used to form films which cure more extensively and at lower temperature. Water insoluble aminoplast resins are particularly preferred in accordance with the invention, e.g., benzoguanamine-formaldehyde condensates.

The copolymers of the invention together with the water miscible organic solvent in which they are produced are dispersed in water with the aid of a base which may be sodium or potassium, but which preferably is a nitrogenous base such as ammonia or an aliphatic amine. The bases used to solubilize the acidic resins of the invention are wholly conventional as is the use of water miscible organic solvents to facilitate dispersion in water.

The aqueous dispersions, pigmented or not as desired, are normally used in electrocoating with a resin solids content of from 1–20%, preferably from 5–15%, and the pH of the bath can vary widely from a pH of 6 or higher as required for stable dispersion. The invention functions particularly well at the higher pH of 8.5 and higher, a pH of up to about 10 being practicable.

The films deposited in accordance with the invention are baked to cure the same. In the absence of an aminoplast resin, baking temperatures of approximately 350° F. and higher are desirably used in order to achieve a measure of cure by reaction between the carboxyl and hydroxy functionalities present in the resin. In the presence of an aminoplast resin, the baking temperatures which may be used are lowered and a more extensive cure is possible. Appropriate baking temperatures are from 200°–500° F. for periods varying from about 30 seconds at the highest baking temperatures to about an hour at the lowest temperatures.

The invention is illustrated in the following examples.

EXAMPLE I

Preparation of styrene-maleic ester-glycidyl ester copolymer (1)

| | Parts by weight |
|---|---|
| 2-butoxy ethanol—Charge into a reactor equipped with an agitator, thermometer, addition funnel and nitrogen inlet tube. Heat to 160° C. | 1050 |

(2)

| | |
|---|---|
| Styrene | 1440 |
| Isodecyl acid maleate | 780 |
| Benzoyl peroxide | 38 |

Premix (2) and add to the reactor over 4 hours at 158–160° C. Hold 1 hour at 160° C.

(3)

| | Parts by weight |
|---|---|
| Tertiary butyl perbenzoate—Add 3 and hold for 1 hour | 5 |

(4)

| | |
|---|---|
| Tertiary butyl perbenzoate—Add 4 and hold for 1 hour. Start cooling to 140° C. | 5 |

(5)

| | |
|---|---|
| Triethyl amine—Add 5 at 140° C. Check acid value: 46.6 | 30 |

(6)

| | |
|---|---|
| Tertiary glycidyl ester A—Add 6 over 15 minutes. Hold for 2 hours. Final acid value 39.8 | 66 |

(7)

| | |
|---|---|
| Methyl ethyl ketone—Add 7 (solvent) | 150 |

The final characteristics of the copolymer are:

| | |
|---|---|
| Solids | 65.5%. |
| Viscosity (Gardner-Holdt) | $Z_4$–$Z_5$. |
| Viscosity (standard poise) | 78 poises. |
| Color (Gardner) | 3–4. |

Evaluation of Example I copolymer in detergent resistant primer formulation

| | Parts by weight |
|---|---|
| Copolymer of Example I (65.5% solids) | 82.5 |
| Benzoguanamine resin (71% solids)—See Note 1 | 33.5 |
| Triethyl amine | 5.9 |
| Deionized water | 678.1 |

The bath had the following composition:

Solids ratio:
  70% copolymer of Example I
  30% benzoguanamine resin of Note 1
100% neutralization with triethyl amine
Total solids of the bath: 10%
Curing time: 20 minutes at 450° F.

The above formulation contains 10% non-volatile solids and is subjected to a direct current at various potentials from 100 v. to 200 v. to provide the following properties.

| Voltage | 100 | 150 | 200 |
|---|---|---|---|
| Film thickness (mils) | .20 | .25 | .36 |
| Appearance | Glossy-smooth. | Glossy-smooth. | Glossy-smooth. |
| Pencil hardness | 7H | 7H | 7H. |
| Detergent resistance (1% Tide solution at 165° F.): | | | |
| 100 hours | No blisters. | | |
| 160 hours | Few blisters of very small size. | | |
| Flexibility (conical mandrel) | Pass 1/8″ bend. | | |
| Solvent resistance | Very good. | | |
| Impact—direct (in./lbs.) | Pass 40 inch/lbs. | | |
| Salt spray resistance (5% NaCl) | Each pass 250 hours. | | |

NOTE 1.—The benzoguanamine resin utilized in a water-insoluble, heat-hardening condensate of benzoguanamine with a stoichiometric excess of formaldehyde. The product is produced by reacting 750 grams of n-butyl Formcel (40% formaldehyde, 51.5% n-butanol and 3.5% water), 630 grams benzoguanamine, and 412 additional grams of n-butanol. The mixture is heated with agitation to 195–200° F. which is maintained for 10–15 minutes until all of the benzoguanamine has dissolved. The pH is adjusted to 4.3–4.5 using a 10% aqueous formic acid solution (approximately 50 milliliters are needed). The temperature is then raised to 203–206° F. to distill n-butanol which is returned to reflux until water (not returned) is no longer generated. After water is no longer generated, butanol is collected in an amount equal to the volume of water which had been collected. The product is then thinned with 310 grams xylene and 135 grams n-butanol and is filtered.

EXAMPLE II

Example I was repeated, only the amount of Tertiary Glycidyl Ester A was increased from 66 parts to 155 parts.

The final polymer exhibited excellent flexibility, adhesion, solvent resistance, detergent resistance, salt spray resistance, and had good hardness and impact ratio properties.

The polymer of this example contains 7% Glycidyl Ester A, based on resin solids, as compared with the 3% present in Example I.

EXAMPLE III

Example I was again repeated, this time replacing the 780 parts isodecyl acid maleate with a corresponding proportion of butyl acid maleate (short chain maleic ester).

The resin of this example was evaluated in an appliance primer and exhibited poor film forming properties in that the electrodeposited film was discontinuous and had many micropores. The film also exhibited poor corrosion resistance properties due to rust formation after 100 hours in salt spray resistance tests. Rusting of the coated panels also occurred when they were immersed into 1% detergent solution (1% Tide at 165° F.).

Two polymers were prepared utilizing the same polymer composition (styrene-isodecyl acid maleate) in order to check the tendency for heteropolymerization as described in U.S. Pat. 3,388,100. The reaction of styrene-isodecyl maleate in alcoholic medium at 80° C. does not form a heteropolymer because, utilizing this procedure, a water dispersible polymer was produced. This indicates that no polystyrene was formed, even when low temperature and bulk polymerization were utilized.

EXAMPLE IV

High temperature-continuous addition polymerization of styrene-isodecyl maleate system (1)

| | Parts by weight |
|---|---|
| 2-butoxy ethanol—Charge into a reactor equipped with an agitator, thermometer, addition funnel and nitrogen inlet tube. Heat to 160° C. | 100 |

(2)

| | |
|---|---|
| Styrene | 108 |
| Isodecyl acid maleate | 64 |
| Benzoyl peroxide | 4.4 |

Dissolve catalyst in monomer blend and add over 4 hour period to reactor at 158–160° C. Hold 1 hour at 160° C.

(3)

| | |
|---|---|
| Tertiary butyl perbenzoate—Add and hold 1 hour at 160° C. | 0.3 |

(4)

| | |
|---|---|
| Tertiary butyl perbenzoate—Add and hold 2 hours at 158–160° C. Cool to room temperature (25° C.) | 0.3 |

The final characteristics of the polymer are:

| | |
|---|---|
| Solids percent | 63.9 |
| Viscosity (poise) | 55 |
| Color (Gardner) | 1 |
| Acid value (non-volatile) | 74.45 |

The polymer of the Example IV was evaluated in a detergent polymer of this Example IV was evaluated in a detergent resistant primer formulation, utilizing the same ratios described in Example I. Excellent detergent resistance, salt spray resistance, hardness and flexibility were obtained.

EXAMPLE V

Low temperature polymerization of styrene-isodecyl maleate system (1)

| | Parts by weight |
|---|---|
| 2-butoxy ethanol | 100 |
| Styrene | 108 |
| Isodecyl acid maleate | 64 |
| Benzoyl peroxide | 4.4 |

Charge 1 into a 3 liter flask and slowly heat to 80–85° C. Watch exotherm. Have cooling bath ready. Maintain at 82–85° C. for one hour.

(2)

| | |
|---|---|
| Tertiary butyl perbenzoate—Add and hold 1 hour at 85° C. | 0.3 |

(3)

| | |
|---|---|
| Tertiary butyl perbenzoate—Add and hold 2 hours | 0.3 |

(4)

| | |
|---|---|
| Tertiary butyl perbenzoate—Add and hold 2 hours. Cool to room temperature (25° C.) | 0.3 |

The final characteristics of the polymer are:

| | |
|---|---|
| Solids percent | 61.61 |
| Viscosity poises | 125 |
| Color (Gardner) | 1 |
| Acid value (non-volatile) | 82.86 |

Evaluation of low temperature polymerization procedure of Example V in detergent resistant primer formulation

| | Parts by weight |
|---|---|
| Copolymer of Example V (61.61% solids) | 91.4 |
| Benzoguanamine resin, 71% solids (see Note 1) | 33.5 |
| Triethyl amine | 8.5 |
| 2-ethoxy ethanol | 25 |
| Deionized water | 641.6 |
| Solids content of bath percent | 10 |
| pH | 9.5 |

Ratio of resin solids:
70% styrene copolymer
30% benzoguanamine resin

Deposited films exhibited the following properties:

| Voltage | 100 | 150 | 175 |
|---|---|---|---|
| Film thickness (mils) | 0.17 | 0.24 | 0.30 |
| Detergent resistance (1% Tide solution at 165° F.) | Each pass 100 hours with no blistering | | |
| Flexibility (conical mandrel) | Each pass 1/8″ bend | | |
| Pencil hardness | 6H | 6H | 6H |

The stability of the electrocoat bath was good for 21 days under constant agitation. This demonstrates very good bath stability. The fact of stable dispersion also demonstrates the absence of polystyrene from the system.

PROPERTIES AND PROCESS VARIATIONS OF STYRENE-MALEIC POLYMERS

| | Example IV | Example V |
|---|---|---|
| Charge composition (parts by weight): | | |
| 2-butoxy ethanol | 100 | 100 |
| Styrene | 108 | 108 |
| Isodecyl acid maleate | 64 | 64 |
| Benzoyl peroxide | 4.4 | 4.4 |
| Tertiary butyl perbenzoate | 0.6 | 0.6 |
| Do | | 0.5 |
| Procedure | (¹) | (²) |
| Final characteristics: | | |
| Solids, percent | 63.9 | 61.61 |
| Acid value (solids) | 74.45 | 82.86 |
| Color (Gardner) | 1 | 1 |
| Viscosity, poises | 55 | 125 |

¹ Continuous addition of monomer to preheated solvent at 160° C.
² One step process at low temperature (80–85° C.).

In the foregoing Examples I–V, the commercial product Uformite QR–336 (Rohm & Haas Company) may be used in place of the benzoguanamine resin of Note 1.

EXAMPLE VI

Bulk copolymerization of styrene-maleic half-ester-liquid maleic bis-ester

| Procedure of preparation: | Parts by weight |
|---|---|
| Styrene | 560 |
| Monobutyl acid maleate | 380 |
| Dioctyl maleate | 460 |
| Benzoyl peroxide | 35 |
| | 1435[1] |

[1] Identified hereinafter as "Monomer Premix A."

(1)

| Monomer Premix A | 300 |
|---|---|

(2)

| Monomer Premix A | 1135 |
|---|---|

Charge 1 slowly into reactor and heat to 160° C. Watch exotherm. Cooling might be necessary when 160° C. is reached. Then add 2 over a three hour period to reactor at 160° C. Hold 1 hour.

(3)

| Tertiary-butyl perbenzoate—Add 3 and hold 1 hour | 4 |
|---|---|

(4)

| Tertiary-butyl perbenzoate—Add 4 and hold 1 hour | 4 |
|---|---|

(5)

| 2-butoxy ethanol | 100 |
|---|---|

(6)

| 2-methoxy ethanol | 200 |
|---|---|

Add solvents 5 and 6 and cool. The final characteristics are:

| Solids | percent | 78.1 |
|---|---|---|
| Viscosity (Gardner-Holdt) | | $Z_6$–$Z_7$ |
| Color (Gardner) | | 1 |
| Acid value (non-volatile) | | 82.6 |

EXAMPLE VII

Preparation of styrene-maleic half-ester-maleic bis ester copolymer by solution polymerization (1)

Parts by weight

| 2-butoxy ethanol—Charge into a reactor equipped with an agitator, thermometer, addition funnel and nitrogen inlet tube. Heat to 160° C. | 490 |
|---|---|

(2)

| Styrene | 1240 |
|---|---|
| Monobutyl acid maleate | 760 |
| Dioctyl maleate | 800 |
| Benzoyl peroxide | 65 |

Premix (2) and add to the reactor over 4 hours at 157–160° C. Hold 1 hour at 160° C.

(3)

| Tertiary butyl perbenzoate—Add 3 and hold for 1 hour | 6 |
|---|---|

(4)

| Tertiary butyl perbenzoate—Add 4 and hold for 2 hours. Start cooling to 120° C. | 6 |
|---|---|

(5)

| Isopropyl alcohol—Add to thin | 475 |
|---|---|

The final characteristics of the copolymer are:

| Solids | percent | 69.0 |
|---|---|---|
| Viscosity (Gardner-Holdt) | | $Z_3$ |
| Color (Gardner) | | 1 |
| Acid value (solids) | | 77 |

Evaluation of Example VI and VII copolymers in coating formulations

The copolymers of Examples VI and VII are utilized in a coating composition by combining the same with a methylated ethylated water dispersible melamine-formaldehyde resin (American Cyanamid XM–1116), and the acidity neutralized with triethanol amine (150% neutralization). The solids ratio of copolymer to melamine resin in each case is 80/20. The neutralized mixture of resins is then dispersed in deionized water to a solids content of 10%, the aqueous bath so-formed having a pH of 9.5. Using a direct electrical current, at 175 volts for 60 seconds at a temperature of 85° F., there is deposited at the anode (iron phosphate treated panels) a film having a thickness of 0.8 mil.

The deposited films, upon baking, were smooth and glossy, had a pencil hardness of 2H, and exhibited good flexibility and solvent resistance. The deposition of resin was quite efficient (about 57 coulombs per gram).

In all of the foregoing examples, all parts are by weight, unless otherwise indicated.

The invention is defined in the claims which follow.

I claim:

1. A method of coating a body capable of carrying an electrical current with a uniform corrosion and detergent resistant nonporous coating comprising immersing said body in an aqueous dispersion comprising water having dispersed therein a copolymer consisting of maleic, fumaric or itaconic alcohol half ester with monoethylenically unsaturated material copolymerizable therewith, said unsaturated material comprising at least one molar proportion of monovinyl aromatic monomer per mol of half ester, said half ester constituting at least 20% by weight of said copolymer, there being from 6–22 carbon atoms in at least the number of ester groups required to be provided by said half ester, and said copolymer being dispersed in water with the aid of a base, said aqueous dispersion further including an aminoplast resin and from 12–45%, based on the weight of total resin, of water miscible organic solvent, passing a unidirectional electrical current through said aqueous dispersion and through said body as anode to deposit a uniform film thereupon, and baking said film to cure the same.

2. A method as recited in claim 1 in which there are at least 2 mols of said monovinyl aromatic monomer per mol of half ester in said copolymer.

3. A method as recited in claim 1 in which said monovinyl aromatic monomer is styrene or vinyl toluene.

4. A method as recited in claim 1 in which said ester groups contain from 8–18 carbon atoms.

5. A method as recited in claim 1 in which said resin has a final acid value in the range of 35–100.

6. A method as recited in claim 1 in which said base is an amine.

7. A method as recited in claim 1 in which said aqueous dispersion includes from 20–40%, based on the weight of total resin, of water miscible alcoholic solvent.

8. A method as recited in claim 1 in which said aminoplast resin is a heat-hardening condensate of formaldehyde with benzoguanamine.

9. A method as recited in claim 1 in which said aqueous dispersion has a resin solids content of from 1–20% and a pH of 6 or higher.

10. A method as recited in claim 1 in which said copolymer consists of maleic, fumaric or itaconic alcohol half ester and monovinyl aromatic monomer and said copolymer is reacted with 1–20% by weight of monoepoxide.

11. A method as recited in claim 10 in which said monoepoxide is a glycidyl ester of an alpha-branched saturated monocarboxylic acid.

12. A method as recited in claim 1 in which said copolymer is formed by copolymerization at a temperature in excess of about 100° C. in the presence of free radical polymerization catalyst at a resin solids content of at least 55%, the organic solvent which is optionally present during the copolymerization being water miscible.

13. A method as recited in claim 12 in which said water miscible organic solvent is an ether alcohol.

14. A method as recited in claim 12 in which the copolymerization is carried out in the presence of a trace of amine catalyst.

15. A method as recited in claim 1 in which said unsaturated material further includes a proportion of non-acidic monoethylenic carboxylic acid alcohol ester or bis ester.

16. A method as recited in claim 15 in which said ester groups containing from 6–22 carbon atoms are present in a maleic, fumaric or itaconic bis ester.

17. A method as recited in claim 15 in which said copolymer consists of maleic, fumaric or itaconic alcohol half ester and bis ester and monovinyl aromatic monomer.

18. A method of coating a body capable of carrying an electrical current with a uniform corrosion and detergent resistant nonporous coating comprising immersing said body in an aqueous dispersion comprising water having dispersed therein a copolymer consisting essentially of maleic, fumaric or itaconic alcohol half ester, maleic, fumaric or itaconic alcohol bis ester, and at least one molar proportion of monovinyl aromatic monomer per mol of half ester, said half ester constituting at least 20% by weight of said copolymer, there being from 6–22 carbon atoms in the ester groups of said bis ester and said copolymer having an acid number in the range of 35–100 and being produced by polymerization at a temperature in excess of 100° C. at a solids content of at least 55% by weight, the organic solvent which is optionally present during the polymerization being water miscible, said copolymer being dispersed in said water with the aid of a base, said aqueous dispersion further including an aminoplast resin and from 12–45%, based on the weight of total resin, of water miscible organic solvent, passing a unidirectional electrical current through said aqueous dispersion and through said body as anode to deposit a uniform film thereupon, and baking said film to cure the same.

19. A method as recited in claim 18 in which said monovinyl aromatic monomer is styrene or vinyl toluene and there are at least 2 mols of said monovinyl aromatic monomer per mol of half ester in said copolymer.

20. A method as recited in claim 18 in which said half ester is monobutyl maleate.

21. A method as recited in claim 18 in which said polymerization is carried out in solution in an ether alcohol.

22. A method of coating a body capable of carrying an electrical current with a uniform corrosion and detergent resistant nonporous coating comprising immersing said body in an aqueous dispersion comprising water having dispersed therein a copolymer consisting essentially of maleic, fumaric or itaconic alcohol half ester containing from 6–22 carbon atoms in the ester group thereof, with at least one molar proportion of monovinyl aromatic monomer per mol of half ester, said half ester constituting at least 25% by weight of said copolymer, and said copolymer being produced by polymerization at a temperature in excess of 100° C. at a solids content of at least 55% by weight, the organic solvent which is optionally present during the polymerization being water miscible, said copolymer being reacted with a glycidyl ester of an alpha-branched saturated monocarboxylic acid to provide a hydroxyl functional acidic resin having an acid number in the range of 35–100, and said resin being dispersed in said water with the aid of a base, said aqueous dispersion further including an aminoplast resin and from 12–45%, based on the weight of total resin, of water miscible organic solvent, passing a unidirectional electrical current through said aqueous dispersion and through said body as anode to deposit a uniform film thereupon, and baking said film to cure the same.

23. A method as recited in claim 22 in which said monovinyl aromatic monomer is styrene or vinyl toluene and there are at least 2 mols of said monovinyl aromatic monomer per mol of half ester in said copolymer.

24. A method as recited in claim 22 in which the polymerization is carried out in solution in an ether alcohol.

References Cited

UNITED STATES PATENTS 3,502,557   3/1970   Yurcheshen et al. ____ 204—181

HOWARD S. WILLIAMS, Primary Examiner